March 16, 1937.    G. W. KALBITZER, JR    2,073,698
VENDING MACHINE
Original Filed Jan. 12, 1935    2 Sheets-Sheet 1
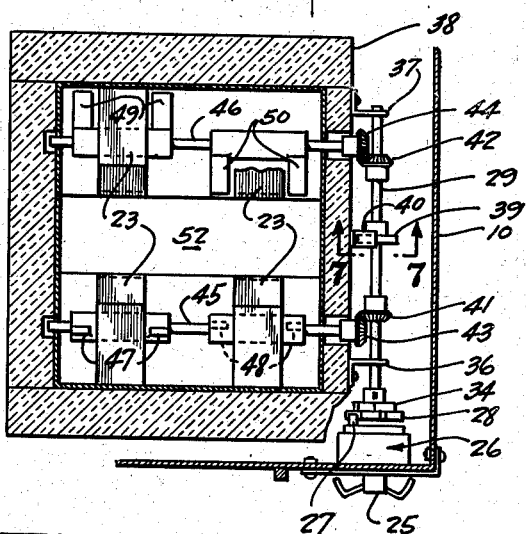
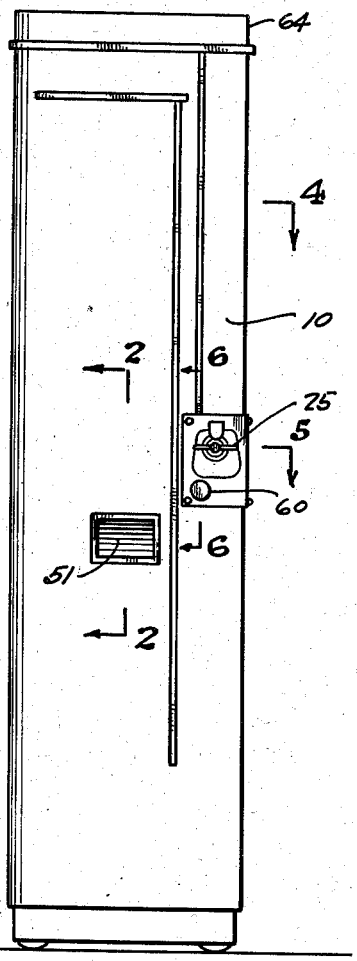
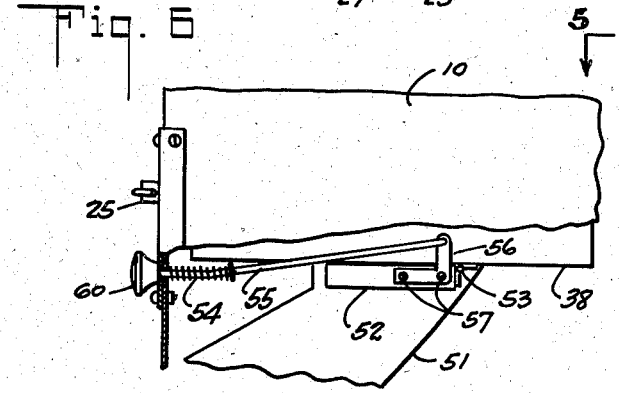
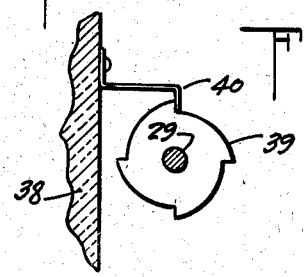
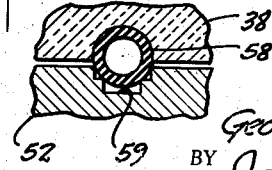
INVENTOR.
George W. Kalbitzer, Jr.
BY Joseph F. Westall
ATTORNEY.

March 16, 1937.  G. W. KALBITZER, JR  2,073,698
VENDING MACHINE
Original Filed Jan. 12, 1935   2 Sheets-Sheet 2
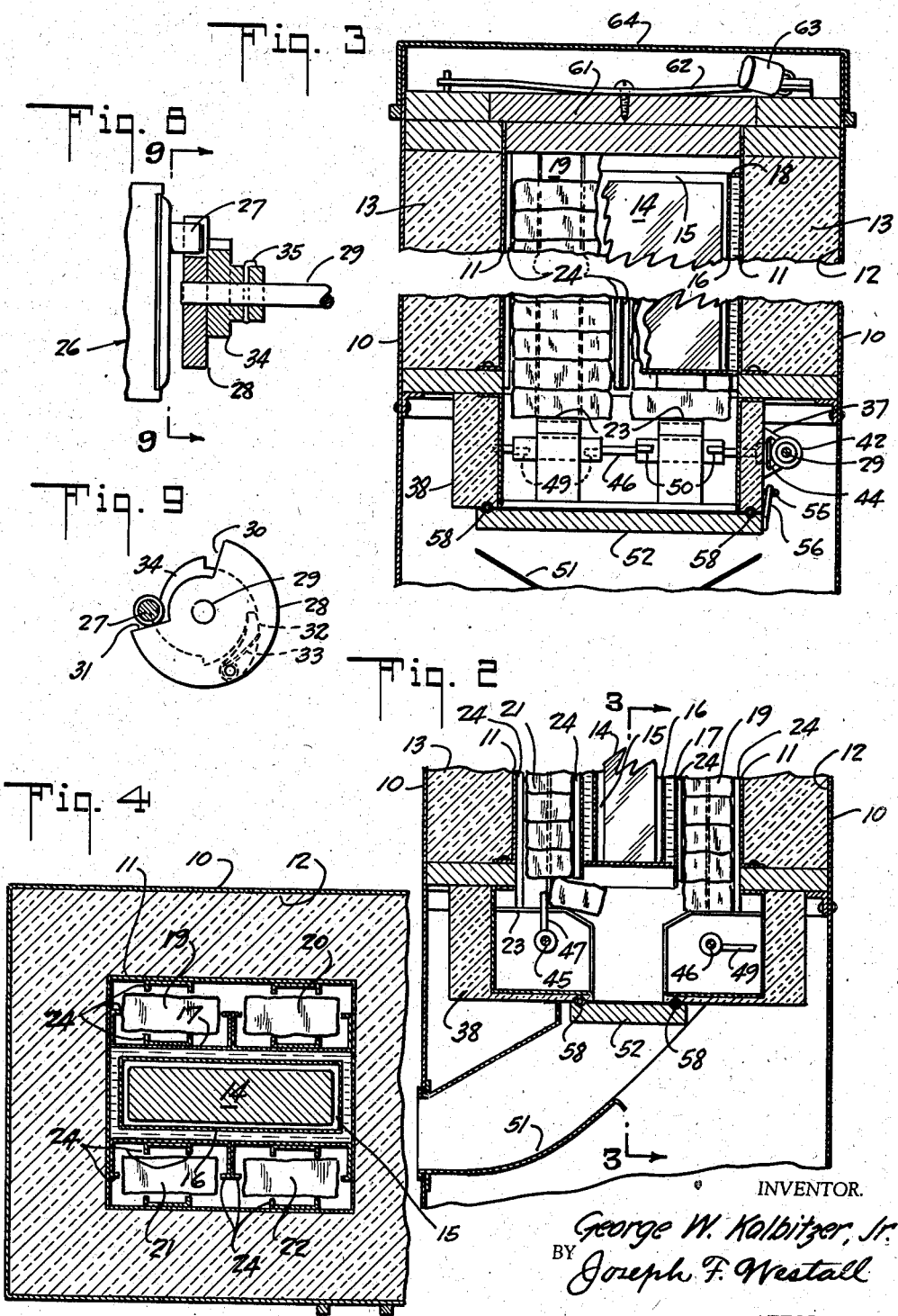
INVENTOR.
George W. Kalbitzer, Jr.
BY Joseph F. Westall
ATTORNEY.

Patented Mar. 16, 1937

2,073,698

UNITED STATES PATENT OFFICE 2,073,698

VENDING MACHINE

George W. Kalbitzer, Jr., Los Angeles, Calif., assignor to The E. Gloo Corporation of America, Los Angeles, Calif., a corporation Application January 12, 1935, Serial No. 1,533
Renewed January 21, 1937

3 Claims. (Cl. 312—36)

This invention relates to storage receptacles equipped with dispensing means for the automatic vending of small packages, and particularly of a heat-insulated multi-chambered container for frozen edibles constructed so as to prevent freezing of the packages to the walls of their storage compartments, said receptacles having coin-controlled manually-operated mechanism for the withdrawal of their packaged contents, one unit at a time, while maintaining the heat insulation intact up to the time of delivery of each package.

The principal object of my said invention is to provide a new, compact and adequately insulated storage cabinet for small, preferably brick-shaped, wrapped packages of such edibles as require thermal protection to avoid deterioration while awaiting sale, said cabinet being provided with efficient means to avoid any but a very brief opening of the insulated chamber at times of withdrawal of packages, and to provide in connection with said storage chamber with its insulation maintaining means, simple and positive manually-operated coin-controlled mechanism for discharging the packaged contents of said cabinet, one unit at a time, into an insulated withdrawal chamber from which one or more may be, with only a momentary opening of the insulated chamber, dropped into a suitable discharge chute.

Another very important object of said invention is to provide in such a vending cabinet as hereinbefore described, a plurality of storage compartments, each adapted to contain a number of packages placed one on top of another and to maintain such packages from contact with the walls of such compartments by a plurality of projecting ribs or fins, longitudinally disposed with relation to said compartment, thus to avoid contact of said packages with extended surfaces of the walls of said chambers, providing instead a series of narrow contacts which, if such freezing should occur, are easily broken by only the weight of the packages when the support below is removed by the withdrawal of a lowermost package.

Still other objects are simplicity of construction of the package-expelling mechanism; a structural arrangement of storage compartments resulting in economy of refrigeration and of space, even distribution of thermal control, facility of replenishment of refrigerant as well as of vendible packages, and comparatively low cost of both construction and maintenance.

Other important objects and corresponding advantages will appear to those of skill in this art from the detailed description of one embodiment of my invention in connection with the accompanying drawings in which,—

Fig. 1 is a front elevation of the storage cabinet showing relative location of coin-control operating handle and outlet of discharge chute;

Fig. 2 is a section on line 2—2 of Fig. 1, showing in longitudinal section the discharge chute and a portion of the package expelling means;

Fig. 3 is a vertical section, enlarged, on line 3—3 of Fig. 2;

Fig. 4 is a horizontal section on line 4—4 of Fig. 1;

Fig. 5 is a horizontal section on line 5—5 of Fig. 1, showing features of the package expelling mechanism;

Fig. 6 is a fragmentary section on line 6—6 of Fig. 1, showing package-discharge door and its operating mechanism;

Fig. 7 is a section on line 7—7 of Fig. 5, showing ratchet mechanism to prevent reverse movement of the main package-expelling operating shaft;

Fig. 8 is a detail sectional view showing operative relationship between the coin-control mechanism and the train of package-expelling means;

Fig. 9 is a section on line 9—9 of Fig. 8;

Fig. 10 is a sectional view of details of trap door closure contacts.

Referring now in detail to the drawings in which like numerals designate similar parts throughout the several views, 10 and 11 indicate, respectively, the outer and inner walls of a refrigerating storage cabinet, and 12 a space between said walls for any suitable insulating material 13.

The refrigerant 14, which is preferably solidified carbon dioxide, or what is commonly known as "dry ice", is contained within an ice compartment 15 (Figs. 2, 3 and 4), which extends laterally from the approximate center of the cabinet on either side, ice compartment 15 having an inner lining 16 spaced apart from adjoining walls 11 and 17 and connected at their upper edges as at 18 to form a fluid tight jacket around said ice compartment, in which jacket before sealing is placed a mixture of butal-alcohol and isopropyl alcohol for maintaining uniform thermal conditions, the principle and mode of action of which is well known in the art.

On each side of said jacketed ice chamber (Fig. 4) are package-storage compartments 19, 20, 21, and 22, each designed to hold a number of preferably brick-shaped foil or paper wrapped packages, placed one on top of another, the lowermost resting on shelf 23, for successive removal at the bottom of each pile as later will be explained. Each of said storage compartments, is provided with parallel longitudinally-extending fins or projecting ribs 24, those on inner surfaces of said storage chambers terminating above the position of lowermost packages, such ribs 24 functioning to prevent surfaces of packages from extended contact with storage-chamber walls.

25 indicates a coin-controlled operating handle. The associated mechanism of handle 25, generally indicated by the numeral 26, and forming, in the details of its construction and assemblage by which the deposit of a coin is adapted to cause operative engagement with package-discharge mechanism, no part of the present invention, are not illustrated in detail, and will not be further described, such means for performing the described function being well known in the art.

It will be sufficient, therefore, to explain that the actuating stud 27 of said coin-control mechanism 26 is caused to rotate in an arc of 180° coincidentally with the turning of handle 25 when the coin has been previously inserted to lock the parts together; and when so locked and turned together, said stud 27 will engage said package-discharge mechanism in the manner about to be described. 28 is a disk loosely mounted on rotatable shaft 29, said disk 28 having a portion of its periphery arcuately cut-away to form radial shoulders 30 and 31, with which said stud 27 is adapted to successively engage when actuated by the turning of handle 25, first, when turned in one direction to set the mechanism for operative package-expelling movement, and second, when turned in the opposite direction to actuate the train of mechanism about to be described to expel a package.

Near the periphery of said disk 28 is pivotally mounted a pawl 32, spring actuated as shown at 33, so as to normally engage the four-toothed periphery of ratchet-head 34, which ratchet-head is pinned at 35 to rotatable shaft 29.

Brackets 36 and 37 (Fig. 5) attached to a wall of casing 38 supports shaft 29 in alignment with the coin-control operating mechanism and with shafts 45 and 46, later to be referred to. A four-toothed ratchet wheel 39 pinned about midway the ends of said shaft 29 is resiliently engaged by the outer ends of a spring dog 40, the opposite end of which is rigidly attached to casing 38, thus permitting rotation of shaft 29 in one direction only. Non-rotatively secured to shaft 29 are bevel gears 41 and 42, which, respectively, mesh with bevel gears 43 and 44, in like manner attached to the respective ends of shafts 45 and 46, each of which last-mentioned shafts centrally longitudinally bisects the lowermost extensions of each adjoining pair of package compartments 19—20 and 21—22, extending from wall to wall within casing 38 and being journalled in said walls.

A series of two pairs of fingers 47 and 48 on shaft 45 and two pairs of fingers 49 and 50 on shaft 46 extend radially from said respective shafts, each pair of fingers being disposed with relation to the other so that when one pair is in radial position to push inward from its supporting shelf 23 the lowermost package of the respective package compartment under which it is disposed, the other three pairs of fingers radially extend from their respective shafts, each at an angle of 90° from another. Each successive reverse turning of the coin-controlled operating handle 25, being communicated to each of shafts 45 and 46 through the chain of mechanism above described, will advance each pair of said fingers a quarter of the distance to or from position to expel a package from its respective compartment.

At the upper end of discharge chute 51 a trap door 52 hinged at 53 is normally held in closed position by the tension of spring 54 acting through rod 55 and bell-crank 56, which latter is attached by screws 57 to one end of trap door 52 as shown most clearly in Fig. 6.

Adjacent the under edge of the package discharge aperture, a trap door closure contact beading 58 (Fig. 10) is provided, said beading consisting of a rubber tubing half sunk in the surface. At contact points of said rubber beading 58 the inner surface of trap door 52 is provided with a rabbet 59 of a cross-sectional contour to provide a plurality of angular contact edges, the beading and rabbet angles being so relatively proportioned as when closed together to slightly compress the rubber thus insuring a tight closure. An operating knob 60 attached to the outermost end of rod 55 outside walls 10 of the refrigerating cabinet enables door 52 to be opened from the outside for the discharge of a package previously expelled from a storage chamber and deposited on the trap door, the package, upon the opening of said door, falling in the discharge chute.

A cover 61 for ice compartment 15 and storage compartments 19, 20, 21 and 22 permits inspection and replenishment of said compartments, and when closed may be locked by a common form of hasp 62 and padlock 63. A telescoping lid 64, for neatness of appearance, covers the top of the cabinet.

In operation, the ice compartment and the four package compartments being stocked, the purchaser deposits the coin in the slot and then turns handle 25 a half turn in a clockwise direction, such movement being communicated through intervening mechanism, not part of the present invention, to stud 27 which, with a 180° range of movement travels half that distance before it reaches the end of the cut-out portion of disk 28. Pawl 32 then engages with one of the teeth of ratchet-head 34. A reverse movement of the operating handle, actuating stud 27 in a reverse direction through an arc of 180°, travels half that distance when it contacts with opposite shoulder of disk 28, which then through the pawl engagement compels the movement of said ratchet-head carrying the shaft to which it is attached the remaining 90° of the range of movement of said stud 27 which movement rotates shaft 29 and through bevel gears 41 and 42, shafts 45 and 46, each a quarter of a turn. One pair of fingers 47, 48, 49 or 50 being, at the beginning of such reverse rotating movement, in position to push a package inwardly into the space above trap door 52, said package by such movement is removed from the bottom of said pile, while each of the remaining pairs of fingers, being distributed radially at successive angles of 90° with respect to each other are advanced a quarter of a turn.

What I claim and desire to secure by Letters Patent is:

1. In a device of the character described, a heat-insulated cabinet, a refrigerating chamber centrally-disposed within said cabinet, a plurality of package storage compartments located on opposite sides of said chamber, a series of ribs on inner walls of said compartments to prevent contact of said vendible packages with the walls of said compartments, a centrally-disposed delivery chute below said refrigerating chamber, a pair of rotatable rods horizontally journalled in said cabinet below the compartments on opposite sides of said chamber, fingers radially positioned on said rods to successively expel the lowermost packages from different compartments into said delivery chute upon rotation of said rods, and a third rod adapted for manual rotation geared to said first mentioned rods to control rotation thereof.

2. In a vending machine of the character described, the combination of a heat-insulated cabinet, a refrigerating chamber centrally disposed within said cabinet, a plurality of package storage compartments arranged on two sides of said chamber each adapted to contain a plurality of rectangular vendible packages piled one on top of another, a receiving chamber within said insulated cabinet, a pair of rotatable rods horizontally journalled in said cabinet below said compartments, a plurality of fingers radially disposed on said rods, means to simultaneously rotate said rods so as to cause said fingers to expel the lowermost of said superposed packages one at a time from each of said storage compartments into said receiving chamber, and manually operated means to permit discharge of packages from said receiving chamber.

3. In a vending machine of the character described, the combination of a heat-insulated cabinet, a centrally disposed refrigerating chamber within said cabinet, a receiving chamber below said refrigerating chamber, a plurality of vendible package-storage compartments separated from each other by said refrigerating chamber, walls of said storage compartments being provided with a series of ribs to prevent freezing contact of said vendible packages with said walls, a pair of rotatable rods horizontally journalled in said cabinet below said compartments and a plurality of fingers radially disposed on said rods to expel the lowermost of said superposed packages one at a time from each of said storage compartments into said receiving chamber, and a shaft geared to said rods adapted for manual rotation.

GEO. W. KALBITZER, Jr.